UNITED STATES PATENT OFFICE.

ENRIQUE MÜLLER, OF EL PASO, TEXAS.

FILTERING MATERIAL.

1,375,532.     Specification of Letters Patent.     Patented Apr. 19, 1921.

No Drawing.     Application filed March 16, 1917. Serial No. 155,245.

*To all whom it may concern:*

Be it known that I, ENRIQUE MÜLLER, a citizen of Mexico, and resident of El Paso, in the county of El Paso and State of Texas, have invented certain new and useful Improvements in Filtering Materials, of which the following is a specification.

My invention relates to an improved filtering stuff composition.

The dominant object of the invention is to provide a filtering stuff for removing all foreign matter from liquids and, as a consequence, purifying the same and rendering them fit for use.

It is a more specific object of the invention to provide a filtering stuff, in which the primary liquid straining means is composed of the cellular texture of plants reduced to ashes, the vegetable ashes being combined with a suitable insoluble binding agent, thus, allowing the microscopical channels in the vegetable ashes to serve as the liquid straining or filtering means.

The invention consists, furthermore, in the novel combination of elements as used in the production of my improved filtering stuff, together with the forming of the same into filtering bodies, which method will be more fully described in the following specification, and then finally embodied in the clauses of the claim, which are appended to the specification and which form an essential part of the same.

As an example, the following formula of the filtering stuff is offered:

The components of the stuff are the cellular texture of plants reduced to ashes, silicate of sodium and clay.

In preparing the stuff, the vegetable ashes are thoroughly cleared in water and then dried, whereupon, a thin pap-like mixture is formed, by combining with clear water two to six volumes of the cleansed vegetable ashes. One volume of silicate of sodium is then poured into the pap-like mixture under constant stirring and permitted to form a gelatin like mass, which mass is permitted to dry, either by solar rays or artificial heat and when dried, is pulverized and thoroughly washed with warm water. During the washing process, the now dried and pulverized stuff is permitted to sink to the bottom of the washing receptacle, whereupon the cleansing water is decanted. The cleansing operation is repeated until the washwater as coming from the pulverized stuff is absolutely tasteless. When these conditions are present, the pulverized stuff is then dried and ground through a fine sieve, thus, producing a powder.

The powdered composition, in quantities of one to six volumes is now mixed with three volumes of thoroughly cleared and dried finely pulverized clay, the product then being moistened with water as if to make assay cupels, whereupon it is pressed into fitted molds to the desired shape. The product is now pressed out of the molds and allowed to dry, the now consistent bodies of the filtering stuff are placed within a muffle and permitted to glow for a predetermined period of time, preferably, several hours. After the glowing process, the bodies are permitted to slowly cool and when taken from the muffle represent the finished or ready product.

It is to be understood, that the hardness of the ready product depends upon the relative proportions of vegetable ashes and clay, also, on the quality of the clay and on the intensity and duration of the heat as employed during the glowing process. If a sandy filtering stuff is desired, instead of the consistent body, the ready product is granulated, either before or after the glowing of the same.

As hereinbefore stated, the microscopical channels as built by nature in the structure of plants are retained in the vegetable ashes and these channels serve as the primary filtering or straining means for the liquid. Since the cellular texture of various plants varies, it is of course at the option of the user or manufacturer to employ plants having either fine or coarse cellular texture, this, obviously, regulating the quality and quantity of the filtration. The quantity of the filtration, may too, be readily varied by changing the proportion of vegetable ashes and clay, while the durability of the commercial product may be regulated accordingly, by reason of the varied proportions of the vegetable ashes and clay and the duration of the glowing process.

Obviously, the formula herein offered may be modified in certain particulars and such modifications, as are within the scope of my claims, I consider within the spirit of my invention.

I claim:

1. In a process of preparing filtering material, treating ashes of vegetable matter with soluble silicate, washing with water and then mixing pulverized clay with the residue.

2. In a process of preparing filtering material, treating leached ashes of vegetable matter with soluble silicate, washing with water and incorporating clay with the residue.

3. In a process of preparing filtering material, treating ashes of vegetable matter with soluble silicate, washing, drying, comminuting the dried material and then incorporating the powdered material with clay.

4. In a process of preparing filtering material, treating leached ashes of vegetable matter with soluble silicate, washing, drying, comminuting the dried material and then incorporating the powdered material with pulverized clay.

5. In a process of preparing filtering material, treating ashes of vegetable matter with soluble silicate, washing, drying, comminuting the dried material, forming a plastic mass of the dried material with water and clay, molding the plastic mixture and then baking same.

6. In a process of preparing filtering material, treating ashes of vegetable matter with soluble silicate, washing, drying, comminuting the dried material, forming a plastic mass of the dried material with water and pulverized clay, molding the plastic mixture, drying and then baking same at a glowing heat.

7. A filtering material comprising clay and the insoluble reaction products of vegetable ashes and soluble silicate.

8. A filtering material comprising clay and the insoluble reaction products of leached vegetable ashes and soluble silicate.

9. A filtering material comprising a baked mass of clay and the insoluble reaction products of vegetable ashes and soluble silicate.

10. A filtering material comprising a baked mass of clay and the insoluble reaction products of leached vegetable ashes and soluble silicate.

In testimony whereof, I affix my signature hereto.

ENRIQUE MÜLLER.